Dec. 1, 1964 J. L. CZUBIAK ETAL 3,159,803

DUAL COAXIAL CAVITY RESONATORS WITH
VARIABLE COUPLING THEREBETWEEN

Filed Nov. 30, 1960

JOSEPH L. CZUBIAK
WILLIS A. FINCHUM
THOMAS S. INSTON, JR.
INVENTORS

BY
SPENSLEY AND HORN
ATTORNEYS 3,159,803

DUAL COAXIAL CAVITY RESONATORS WITH VARIABLE COUPLING THEREBETWEEN

Joseph L. Czubiak, Canoga Park, Calif., Willis A. Finchum, Logan, Utah, and Thomas S. Inston, Jr., Canoga Park, Calif., assignors, by mesne assignments, to The Bunker-Ramo Corporation, Stamford, Conn., a corporation of Delaware Filed Nov. 30, 1960, Ser. No. 72,769
13 Claims. (Cl. 333—83)

This invention relates to electrically resonant devices and more particularly to improved cavity resonators and the coupling of electrical energy thereto.

It is well known that a space completely enclosed by conducting walls can contain oscillating electromagnetic fields within it and will possess certain resonant frequencies when excited by electrical oscillations. Resonators of this type are commonly termed "cavity resonators" and are extensively used as resonant circuits at ultra-high frequencies where the parallel L-C circuit consisting of an ordinary coil and capacitor becomes impractical because of its high losses and extremely small size. Gravity resonators possess the advantage of lower dielectric, radiation, and copper losses and so have a much higher Q than could be obtained with a coil and capacitor at the same frequency.

In electronic assemblies for missile and aircraft applications reliability and stability are paramount. In addition such assemblies must be compact and of very light weight. Prior art cavity resonators possess several disadvantages for use under such rigorous specifications. Cavity resonators may be tuned over a small frequency range by the use of a tuning plug or rotatable paddle. Tuning over a relatively large frequency range is currently accomplished by changing the physical dimensions of the cavity, either by distorting or displacing a cavity wall. A cavity which is tuned by changing its physical dimensions cannot be made as structurally rigid as a cavity of fixed dimensions and hence is less stable under shock and vibration. Electromagnetic energy is coupled to cavity resonators usually by a coupling loop or a probe. These coupling methods also tend to limit stability under shock and vibration. Further stability limitations are introduced in applications wherein adjustable coupling must be provided.

It is therefore an object of the present invention to provide improved cavity resonator structures.

It is also an object of the present invention to provide improved cavity resonators with efficient coupling of electromagnetic energy thereto and therefrom.

It is another object of the present invention to provide improved cavity resonators with efficient adjustable coupling of electromagnetic energy thereto and therefrom.

It is a further object of the present invention to provide improved coupled cavity resonators with efficient adjustable coupling of electrical energy therebetween.

It is a still further object of the present invention to provide an improved cavity resonator which can be tuned over a relatively wide frequency range without changing the cavity size.

It is yet another object of the present invention to provide an improved cavity resonator which is readily reproducible using mass production techniques.

A reduction in resonator size for a given frequency has been achieved without a significant decrease in cavity Q by the recent development of a coaxial resonator having a helical coil inner conductor. This form of coaxial resonator currently provides a minimum practical resonator size for a given frequency and hence should prove useful in applications where compactness is a requisite. The objects of the present invention are accomplished by the incorporation of novel adjustable tuning and coupling devices into the structure of the aforementioned coaxial resonator. In accordance with the present invention electromagnetic coupling to the resonator is achieved by application of the autotransformer principle to the helical coil inner conductor, the coil being tapped near one end and the coupling being across the portion of the coil between that end and the tap. Adjustable tuning is achieved without changing resonator dimensions by the provision of a small variable capacitance in shunt with the remaining portion of the helical coil inner conductor, i.e., between the tap and the other end of the coil. The present invention also provides for the adjustable capacitive intercoupling of a plurality of such resonators in a chamber of nonmagnetic material.

The present invention will be illustrated by a presently preferred embodiment of a UHF preselector utilizing two of the improved coaxial resonators coupled together, the outer conductors of the resonators being formed by cylindrical apertures in a block of electrically conductive nonmagnetic material. Although in the illustrated embodiment the conductive block is utilized as a point of common signal potential, it is understood that other configurations are possible wherein separate electrical conductors are utilized to connect with a point of common signal potential. It is also understood that the illustrated embodiment is only one of many that come within the purview of the present invention.

Other objects and a fuller understanding of the present invention may be had by referring to the following description and claims, taken in conjunction with the accompanying drawing in which:

Figures 1, 2, 3, 4, 5:
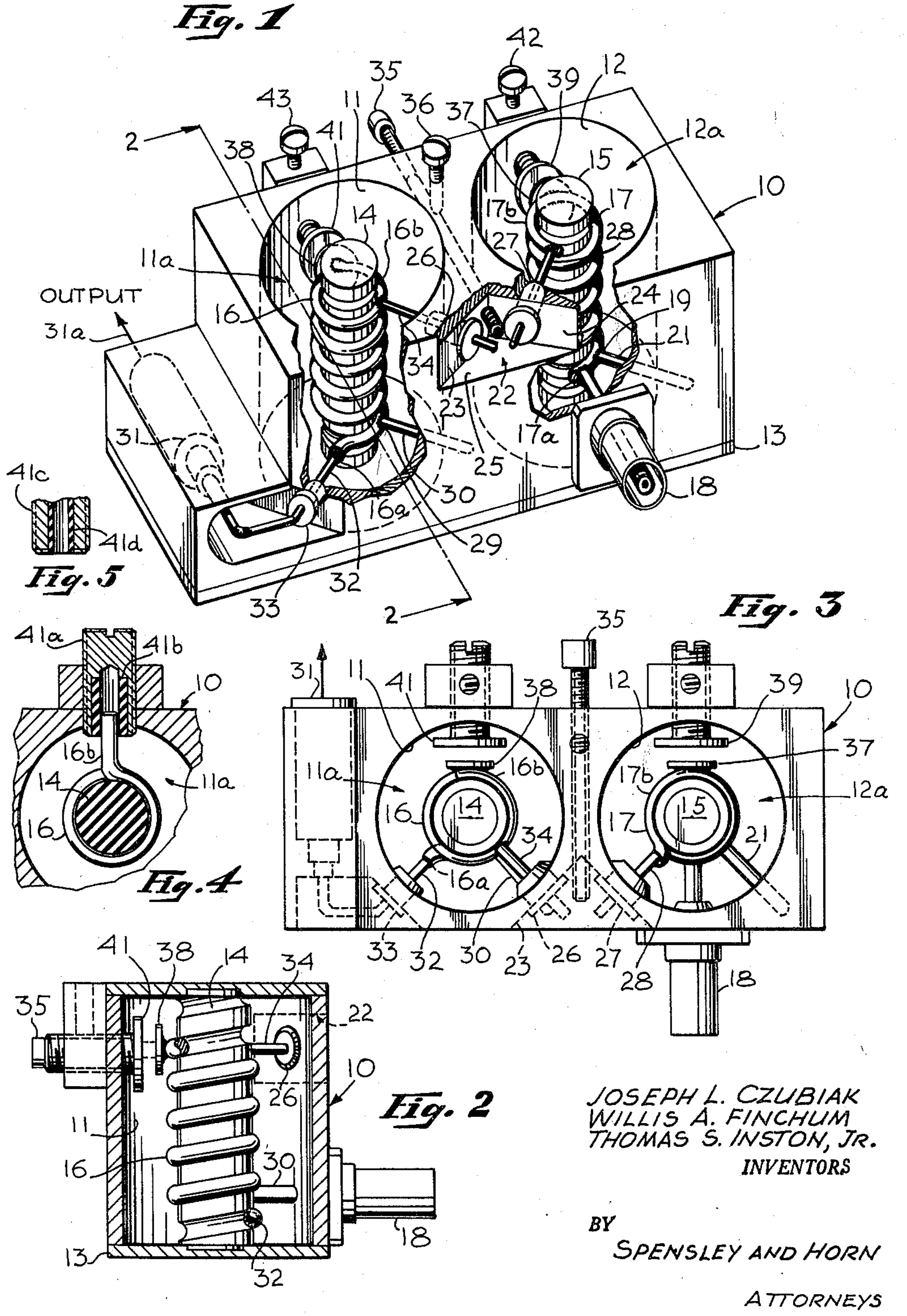
FIGURE 1 shows a phantom perspective view of one embodiment of the present invention.
FIGURE 2 is an elevational view taken along the line 2—2 of FIGURE 1.
FIGURE 3 is a plan view of the device of FIGURE 1.
FIGURE 4 is a sectional view of a portion of FIGURE 1 showing a modified tuning member.
FIGURE 5 is a sectional view of a portion of a modified tuning member used in the structure of FIGURE 4.

Referring now to FIGURES 1, 2 and 3 of the drawing, the present invention is illustrated as being structurally incorporated in a body block, generally indicated by the reference numeral 10, the block being of aluminum or any other electrically conductive nonmagnetic material. Extending through the block 10 are two cylindrical apertures, a first cylindrical aperture 11*a* defined by a cylindrical wall surface 11 and a second cylindrical aperture 12*a* defined by a cylindrical wall surface 12. The cylindrical wall surfaces are silver-plated to insure a high Q, and form the outer shield conductor of the coaxial resonators. Detachably secured to the bottom of the block 10 is a bottom plate 13 upon which are vertically mounted coil forms 14 and 15 constructed of Teflon or other suitable insulating material. The coil forms 14 and 15 coaxilly extend into the cylindrical apertures in the block 10. Wound on the coil form 14 is a helical wire coil 16 and on the coil form 15 a helical wire coil 17. The helical coils 16 and 17 form the inner conductors of the coaxial resonators. The turns of the coil fit into spiral grooves in the periphery of each respective coil form to thereby insure a rigid coil assembly. Thus the basic structure of the cylindrical wall 12 and the helical coil 17 form a first coaxial resonator while the basic structure of cylindrical wall 11 and helical coil 16 form a second cavity resonator.

A coaxial input connector 18 is provided for connection of a coaxial cable from a suitable antenna to feed electromagnetic energy to the preselector unit. The electromagnetic energy is coupled to the unit by application of the autotransformer principle to the turns of the coil 17. One end 17*a* of the coil 17 is connected to the coaxial input connector 18, and a tap 19 on the coil 17 is connected to the block 10 by an electrical conductor 21. (The block 10 is utilized as a point of common signal potential, i.e., ground.)

There is no significant inductive coupling between the first and second coaxial resonators, adjustable capacitive coupling being utilized to transfer electromagnetic energy between them. Formed in the block 10 is a chamber 22, a V-shaped notch in the illustrated embodiment. The chamber 22 is defined by inwardly converging side walls 23 and 24 and a bottom wall surface 25. This chamber is in communication with the first and second cylindrical apertures by means of connected passageways cut through the block 10. Mounted in the connecting passageways are insulating tubes 26 and 27. An electrical conductor 28 is connected to a tap near the other end 17*b* of the coil 17 and extends through the insulating tube 27 with the end of the conductor 28 projecting into the V-shaped chamber. The coil 16 is provided with the tap 29 near one end 16*a* thereof, the tap being connected to the block 10 by an electrical conductor 30. The end 16*a* of the coil 16 is connected to a suitable output circuit, such as a crystal mixer 31 and output conductor 31*a* in the illustrated embodiment, through an electrical conductor 32 extending through a passageway in the block 10 and insulated therefrom by a length of insulated tubing 33. Thus, the autotransformer principle is also utilized to withdraw electromagnetic energy from the second coaxial resonator. An electrical conductor 34 is connected to a tap near the other end 16*b* of the coil 16 and extends through the insulating tube 26 with the end of the conductor projecting into the V-shaped chamber and spaced apart from the end of the electrical conductor 28 extending into the chamber. Hence, electromagnetic energy is capacitively coupled from the first to the second coaxial resonator in the chamber. Adjustment of this capacitive coupling is provided by a screw element 35, threaded through the block 10 and extending into the chamber 22 between the ends of the conductors 28 and 34. Threading the screw element 35 within the chamber toward and away from the ends of the conductors 28 and 34 respectively, variably distorts the electric field in the chamber, thereby altering the capacitive coupling between the resonators. A set screw 36 is provided to lock the adjustment of the adjustable screw element 35.

An additional feature of the present invention is the provision of means to adjust the tuning of each resonator over a fairly wide frequency range without changing the resonator dimensions. Soldered to the end 17*b* of the coil 17 is a small metal disc 37. A similar disc 38 is soldered to the end 16*b* of the coil 16. Adjustable tuning members 39 and 41, in the form of nonmagnetic metallic screws, are threaded through the block 10 into the cylindrical aperture 12*a* and 11*a* respectively, with their ends in alignment with the discs 37 and 38 respectively. Adjustment of the tuning members 39 and 41 provide variation of the small capacitance shunting the coils 16 and 17, respectively, since taps near the lower end of the coils are connected directly to the block 10. Set screws 42 and 43 are provided to lock the respective adjustments of the tuning members 39 and 41.

In FIGURE 4 there is shown an alternate adjustable tuning member 41*a* usable in place of the tuning members 39 and 41.

The tuning member 41*a* is provided with a center opening having inserted therein an insulating bushing 41*b* or tube of a suitable material such as Teflon. The bushing 41*b* is also provided with a center opening for receiving therein a coil extension 16*b* of the coil 16. It can be seen that the capacity of the extension 16*b* to tuning member 41*a* can be varied by threading the member 41*a* into varying engagement with the extension 16*b*.

For coarse tuning of different frequency ranges (see FIGURE 5), it is noted that different bushings 41*d* and tuning members 41*c* can be used with each bushing 41*d* having a different wall thickness.

As the wall thickness increases in the bushing 41*b*, the opening in the tuning member 41*a* also increases since the central opening in the bushing 41*b* must remain unchanged for a good close fit to the coil extension 16*b*. It is further pointed out that a single tuning member 41*a* (not shown) may have tandem arranged bushing areas of different wall thickness for different frequency bands.

The design of the basic resonator structure (cylindrical wall 12 and coil 17, and cylindrical wall 11 and coil 16) is straightforward and well known to the art. See, for example, page 600 of "Reference Data for Radio Engineers," fourth edition, edited by International Telephone and Telegraph Corporation; and the article entitled "Coaxial Resonators With Helical Innerconductor," by W. W. Macalpine and R. O. Schildknecht, appearing in volume 47, number 12, of the proceedings of the I.R.E. December 1959, page 2099.

As a practical example of the UHF preselector of the illustrated embodiment of the present invention, a device for operation over the frequency range of from about 400 to about 550 mc. possesses the following characteristics. The basic coaxial resonator is designed for operation at a resonant frequency of approximately 470 mc. The outer shield conductor (coaxial aperture) is one inch in diameter and 1.33 inches in length. The helical inner conductors are constructed of number 10 hook-up wire and wound on Teflon coil forms with a mean coil diameter of ⅜ to ½ inch. The coil consists of approximately four turns wound at a pitch corresponding to 6 turns per inch. The coils are tapped at about ¼ turn up from the bottom end to match the impedances of the particular input and output circuits utilized. The tuning discs (reference numerals 37 and 38) are constructed of copper and are about ¼ inch in diameter. These discs are soldered to the uppermost ends of the coils. With the walls of the cylindrical aperture silver-plated a device Q of about 1,000 is obtained and the tuning range is over 100 mc.

Although the outer conductors of the coaxial resonators of the illustrated embodiment of the present invention are formed by apertures through a solid aluminum block, it is understood that these outer conductors can also be conveniently formed of metallic tubing. The method of construction utilized in the illustrated embodiment results in an extremely small and compact UHF preselector unit which, because of the novel adjustable tuning and coupling features, is readily reproducible by mass production techniques. The novel tuning and autotransformer coupling technique can, of course, be applied to single coaxial resonators. Hence, although the invention has been described with a certain degree of particularity, it is understood that the present disclosure has been made only by way of example and that numerous changes in the details of construction and the combination and arrangement of parts may be resorted to without departing from the spirit and the scope of the invention as hereafter claimed.

What is claimed is:

1. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture;

a second helical coil coaxially disposed within said second cylindrical aperture;

a first elongated electrical conductor extending through said first connecting passageway in said body and electrically insulated therefrom, one end of said first conductor being connected to a predetermined point on said first coil, the other end of first conductor extending into said chamber;

a second elongated electrical conductor extending through said second connecting passageway in said body and electrically insulated therefrom, one end of said second conductor being connected to a predetermined point on said second coil, the other end of said second conductor extending into said chamber and spaced apart from said other end of said first conductor which extends into said chamber; and an electrically conductive element adjustably mounted relative to said body and in electrical contact therewith, a portion of said element extending into said chamber in said body, said portion of said element being selectively adjustable to a predetermined distance from the spaced ends of said first and second conductors within said chamber.

2. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture, said first coil being tapped at a first predetermined point near one end thereof;

a second helical coil coaxially disposed within said second cylindrical aperture, said second coil being tapped at a first predetermined point near one end thereof;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first disc of an electrically conductive material mounted to the other end of said first coil and in electrical contact therewith;

a second disc of electrically conductive material mounted to the other end of said second coil and in electrical contact therewith;

a first tuning member of an electrically conductive material adjustably mounted relative to said body and in electrical contact therewith, a portion of said first tuning member extending into said first aperture and being selectively adjustable to a second predetermined distance from said first disc; and, a second tuning member of electrically conductive material adjustably mounted relative to said body and in electrical contact therewith, a portion of said second tuning member extending into said second aperture and being selectively adjustable to a third predetermined distance from said second disc.

3. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture, said first coil being tapped at a first predetermined point near one end thereof;

first coupling means connected to said tap at said first predetermined point on said first coil, said first coupling means being adapted for coupling to a source of electromagnetic energy;

a second helical coil coaxially disposed within said second cylindrical aperture, said second coil being tapped at a first predetermined point near one end thereof;

second coupling means connected to said tap at said first predetermined point on said second coil, said second coupling means being adapted for the withdrawal of electromagnetic energy from said second aperture and said second coil;

a first elongated electrical conductor extending through said first connecting passageway in said body and electrically insulated therefrom, one end of said first conductor being connected to a second predetermined point on said first coil and the other end of said first conductor extending into said chamber;

a second elongated electrical conductor extending through said second connecting passageway in said body and electrically insulated therefrom, one end of said second conductor being connected to a second predetermined point on said second coil and the other end of said second conductor extending into said chamber and spaced apart from said other end of said first conductor which extends into said chamber; and, an electrically conductive element adjustably mounted relative to said body and in electrical contact therewith and with a portion of said element extending into said chamber in said body, said portion of said element being selectively adjustable to a predetermined distance from the spaced ends of said first and second conductors within said chamber.

4. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture, said first coil being tapped at a first predetermined point near one end thereof, said one end of said first coil being adapted for coupling to a source of electromagnetic energy;

a second helical coil coaxially disposed within said second cylindrical aperture, said second coil being tapped at a first predetermined point near one end thereof, said one end of said second coil being adapted for the withdrawal of electrical energy from said second aperture and said second coil;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first disc of an electrically conductive material mounted to the other end of said first coil and in electrical contact therewith;

a second disc of electrically conductive material mounted to the other end of said second coil and in electrical contact therewith;

a first tuning member of an electrically conductive material adjustably mounted relative to said body and in electrical contact therewith, a portion of said first tuning member extending into said first aperture and being selectively adjustable to a second predetermined distance from said first disc; and a second tuning member of electrically conductive material adjustably mounted relative to said body and in electrical contact therewith, a portion of said second tuning member extending into said second aperture and being selectively adjustable to a third predetermined distance from said second disc.

5. A coaxial resonator device comprising:

a first body of electrically conductive material defining a first and a second cylindrical aperture therein;

a second body having convergent side wall surfaces of nonmagnetic material and top and bottom surfaces of nonmagnetic material to define a chamber therein, said chamber being in communication with the first aperture in said first body by a first passageway formed of electrically conductive nonmagnetic material and in communication with the second aperture in said first body by a second passageway formed of electrically conductive nonmagnetic material;

a first helical coil axially disposed within said first cylindrical aperture;

a second helical coil coaxially disposed within said second cylindrical aperture;

a first elongated electrical conductor extending through said first connecting passageway and electrically insulated therefrom, one end of said first conductor being connected to a predetermined point on said first coil, the other end of said first conductor extending into said chamber;

a second elongated electrical conductor extending through said second connecting passageway and electrically insulated therefrom, one end of said second conductor being connected to a predetermined point on said second coil, the other end of said second conductor extending into said chamber and spaced apart from said other end of said first conductor which extends into said chamber; and, an electrically conductive element adjustably mounted relative to said second body and in electrical contact therewith, a portion of said element extending into said chamber, said portion of said element being selectively adjustable to a predetermined distance from the spaced ends of said first and second conductors within said chamber.

6. A coaxial resonator device for operation at a predetermined resonant frequency comprising:

a body of electrically conductive material defining a first and a second cylindrical aperture therein, said body having substantially parallel planar upper and lower surfaces, said first and second cylindrical apertures being in substantially parallel alignment with their axes substantially perpendicular to said upper and lower surfaces of said body, said apertures extending between said upper and lower surfaces, said body having a chamber therein extending downward from said upper surface and defined by convergent side wall surfaces substantially parallel to the axes of said cylindrical apertures and a bottom surface substantially parallel to the lower surface of said body, said chamber being in communication with said first aperture by a first connecting passageway and in communication with said second aperture by a second connecting passageway;

a first helical coil coaxially disposed within said first cylindrical aperture, said first coil being tapped at a first predetermined point near one end thereof, said one end of said first coil being adapted for coupling to a source of electromagnetic energy;

a second helical coil coaxially disposed within said second cylindrical aperture, said second coil being tapped at a first predetermined point near one end thereof, said one end of said second coil being adapted for the withdrawal of electrical energy from said second aperture and said second coil;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first disc of an electrically conductive material mounted to the other end of said first coil and in electrical contact therewith;

a first tuning member of an electrically conductive material adjustably mounted relative to said body and in electrical contact therewith, a portion of said first tuning member extending into said first aperture and being selectively adjustable to a second predetermined distance from said first disc; and a second tuning member of electrically conductive material adjustably mounted relative to said body and in electrical contact therewith, a portion of said second tuning member extending into said second aperture and being selectively adjustable to a third predetermined distance from said second disc.

7. In a coaxial cavity resonator suitable for use in environments wherein said resonator is subject to substantial mechanical vibration and temperature changes, said resonator being of the type having a body of electrically conductive material with a pair of cylindrical cavities therein, there being a pair of helical coils, one of said coils being disposed axially in each of said cavities and means for connecting one of said coils to an input and the other of said coils to an output means, the combination with said cavity resonator of a coupling means between said coils comprising:

a chamber in said body, said chamber being positioned adjacent each of said cavities;

a pair of elongated electrical conductors each having a free end and each having another end connected respectively to a predetermined point on each of said coils;

passageways in said body communicating between each of said cavities and said chamber and having electrical insulation means disposed therein, said conductors extending through said insulation means and into said chamber, said free ends of said conductors being disposed in spaced relationship;

and an element adjustably carried by and electrically connected to said body and extending into said chamber, an end of said element being positioned adjacent said spaced ends of said conductors whereby movement thereof relative to said ends of said conductors will alter capacitive coupling between the coils.

8. In a coaxial cavity resonator suitable for use in environments wherein said resonator is subject to substantial mechanical vibration and temperature changes, said resonator being of the type having a body of electrically conductive material with a pair of cylindrical cavities therein, there being a pair of helical coils, one of said coils being disposed axially in each of said cavities and means for connecting one of said coils to an input and the other of said coils to an output means, the combination with said cavity resonator of a vibrationally and thermally stable coupling means between said coils and tuning means for said resonator comprising:

a chamber in said body, said chamber being positioned adjacent each of said cavities;

a pair of elongated electrical conductors each having a free end and each having another end connected respectively to a predetermined point on each of said coils;

passageways in said body communicating between each of said cavities and said chamber and having electrical insulation means disposed therein, said conductors extending through said insulation means and into said chamber, said free ends of said conductors being disposed in spaced relationship;

an element adjustably carried by and electrically connected to said body and extending into said chamber, an end of said element being positioned substantially intermediate said spaced ends of said conductors whereby movement thereof relative to said ends of said conductors will alter capacitive coupling between said coils;

an extension from each of said coils, said extension being from an end of each of said coils remote from the input and output connections thereto;

a pair of tuning members of electrically conductive material each adjustably carried by said body and in electrical contact therewith and each extending respectively into one of said cavities, a central axial portion of each of said members being recessed to a diameter greater than a diameter of said extension from each coil, one of said extensions being disposed in each of said recessed members and spaced from walls thereof;

and a nonelectrically conductive insert positioned in each of said recessed members and in intimate contact with said walls thereof and said extensions positioned therein.

9. Variable capacitance coupling means useful in coupling a pair of coils, said coils being carried by a body providing a common ground plane, said coupling means comprising:

a chamber in the body;

a pair of electrical conductors each electrically connected respectively to one of the coils and having free ends disposed in said chamber and in adjacent spacial relationship, said free ends providing a fixed capacitive coupling between said coils;

and an adjusting member carried by and in electrical contact with said body, said adjusting member having a free end positioned in said chamber and in substantially equal adjacent spacial relationship to said free ends of said electrical conductors, whereby movement of said adjusting member to alter the relationship of said free end thereof relative to said free ends of said conductors will alter the capacitive coupling between said free ends of said conductors.

10. Variable capacitance coupling means in accordance with claim 9 wherein said conductors are disposed at an acute angle to each other and said free end of said adjusting member is positioned within said acuate angle, axes of said conductors and said adjusting member lying in a common plane.

11. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture, said first coil being tapped at a first predetermined point near one end thereof;

a second helical coil coaxially disposed within said second cylindrical aperture, said second coil being tapped at a first predetermined point near one end thereof;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first coil extension of electrically conductive material mounted on the other end of said first helical coil and in electrical contact therewith;

a second coil extension of electrically conductive material mounted on the other end of said second helical coil and in electrical contact therewith;

a first tuning member of an electrically conductive material adjustably mounted relative to said body and in electrical contact therewith, a portion of said first tuning member extending into said first aperture and having a center portion with an opening of a diameter greater than said first coil extension and receivable of said first extension by an amount established by said adjustability;

a second tuning member of an electrically conductive material adjustably mounted relative to said body and in electrical contact therewith, a portion of said second tuning member extending into said second aperture and having a center portion with an opening of a diameter greater than said second coil extension and receivable of said second extension by an amount established by said adjustability;

first insulating means positioned within said first tuning member opening, said first insulating means having a central opening of a diameter substantially equal to said first coil extension of electrically conductive material; and second insulating means positioned within said second tuning member opening, said second insulating means having a central opening of a diameter substantially equal to said second coil extension of electrically conductive material.

12. A coaxial resonator device comprising:

a body of electrically conductive material defining a first and a second cylindrical aperture therein and a chamber therein in communication with said first aperture by a first connecting passageway and with said second aperture by a second connecting passageway;

a first helical coil coaxially disposed within said first cylindrical aperture, said first coil being tapped at a first predetermined point near one end thereof, said one end of said first coil being adapted for coupling to a source of electromagnetic energy;

a second helical coil coaxially disposed within said second cylindrical aperture, said second coil being tapped at a first predetermined point near one end thereof, said one end of said second coil being adapted for the withdrawal of electrical energy from said second aperture and said second coil;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first coil extension of electrically conductive material mounted on the other end of said first helical coil and in electrical contact therewith;

a second coil extension of electrically conductive material mounted on the other end of said second helical coil and in electrical contact therewith;

a first tuning member of an electrically conductive material adjustably mounted relative to said body and in electrical contact therewith, a portion of said first tuning member extending into said first aperture and having a center portion with an opening of a diameter greater than said first coil extension and receivable of said first extension by an amount established by said adjustability;

a second tuning member of an electrically conductive material adjustably mounted relative to said body and in electrical contact therewith, a portion of said second tuning member extending into said second aperture and having a center portion with an opening of a diameter greater than said second coil extension and receivable of said second extension by an amount established by said adjustability;

first insulating means positioned within said first tuning member opening, said first insulating means having a central opening of a diameter substantially equal to said first coil extension of electrically conductive material; and second insulating means positioned within said second tuning member opening, said second insulating means having a central opening of a diameter substantially equal to said second coil extension of electrically conductive material.

13. A coaxial resonator device for operation at a predetermined resonant frequency comprising:

a body of electrically conductive material defining a first and a second cylindrical aperture therein, said body having substantially parallel planar upper and lower surfaces, said first and second cylindrical apertures being in substantially parallel alignment with their axes substantially perpendicular to said upper and lower surfaces of said body, said apertures extending between said upper and lower surfaces, said body having a chamber therein extending downward from said upper surface and defined by convergent side wall surfaces substantially parallel to the axes of said cylindrical apertures and a bottom surface substantially parallel to the lower surface of said body, said chamber being in communication with said first aperture by a first connecting passageway and in communication with said second aperture by a second connecting passageway;

a first helical coil coaxially disposed within said first cylindrical aperture, said first coil being tapped at a first predetermined point near one end thereof, said one end of said first coil being adapted for coupling to a source of electromagnetic energy;

a second helical coil coaxially disposed within said second cylindrical aperture, said second coil being tapped at a first predetermined point near one end thereof, said one end of said second coil being adapted for the withdrawal of electrical energy from said second aperture and said second coil;

a first elongated electrical conductor extending through said first connecting passageway in said body and electrically insulated therefrom, one end of said first conductor being connected to a second predetermined point on said first coil, the other end of said first conductor extending into said chamber;

a second elongated electrical conductor extending through said second connecting passageway in said body and electrically insulated therefrom, one end of said second conductor being connected to a second predetermined point on said second coil, the other end of said second conductor extending into said chamber and spaced apart from said other end of said first conductor which extends into said chamber;

an electrically conductive element adjustably mounted relative to said body and in electrical contact therewith and with a portion of said element extending into said chamber in said body, said portion of said element being selectively adjustable to a first predetermined distance from the spaced ends of said first and second conductors within said chamber;

a first electrical conductor connecting said tap at said first predetermined point on said first coil to said body;

a second electrical conductor connecting said tap at said first predetermined point on said second coil to said body;

a first coil extension of electrically conductive material mounted on the other end of said first helical coil and in electrical contact therewith;

a second coil extension of electrically conductive material mounted on the other end of said second helical coil and in electrical contact therewith;

a first tuning member of an electrically conductive material adjustably mounted relative to said body and in electrical contact therewith, a portion of said first tuning member extending into said first aperture and having a center portion with an opening of a diameter greater than said first coil extension and receivable of said first extension by an amount established by said adjustability;

a second tuning member of an electrically conductive material adjustably mounted relative to said body and in electrical contact therewith, a portion of said second tuning member extending into said second aperture and having a center portion with an opening of a diameter greater than said second coil extension and receivable of said second extension by an amount established by said adjustability;

first insulating means positioned within said first tuning member opening, said first insulating means having a central opening of a diameter substantially equal to said first coil extension of electrically conductive material; and second insulating means positioned within said second tuning member opening, said second insulating means having a central opening of a diameter substantially equal to said second coil extension of electrically conductive material.

References Cited in the file of this patent

UNITED STATES PATENTS

| | | |
|---|---|---|
| 2,239,905 | Trevor | Apr. 29, 1941 |
| 2,428,272 | Evans | Sept. 30, 1947 |
| 2,437,085 | Evans | Mar. 2, 1948 |
| 2,515,225 | Holst et al. | July 18, 1950 |
| 2,589,091 | Kihn | Mar. 11, 1952 |
| 2,753,530 | Horvath | July 3, 1956 |